United States Patent [19]

Haverdink

[11] 4,024,920
[45] May 24, 1977

[54] ROOT CROP HARVESTER

[75] Inventor: Virgil Dean Haverdink, Ankeny, Iowa

[73] Assignee: Deere & Company, Moline, Ill.

[22] Filed: Oct. 24, 1975
(Under Rule 47)

[21] Appl. No.: 625,736

[52] U.S. Cl. .................................. 171/58; 198/663
[51] Int. Cl.² ....................................... A01D 17/00
[58] Field of Search .............. 171/58, 23; 198/211; 209/137; 130/30 P

[56] References Cited

UNITED STATES PATENTS

| 2,232,431 | 2/1941 | Bilocq | 198/211 |
| 2,881,905 | 4/1959 | Hawkins | 198/211 |
| 3,654,997 | 4/1972 | Partyanko et al. | 171/58 |
| 3,809,164 | 5/1974 | Hook et al. | 171/58 |
| 3,848,733 | 11/1974 | McAlister | 198/211 |

FOREIGN PATENTS OR APPLICATIONS 1,074,309   1/1960   Germany.

Primary Examiner—Russell R. Kinsey

[57] ABSTRACT

A root crop harvester having an annular root elevating conveyor supported for rotation about a horizontal axis and for elevating mud laden roots, a retaining mechanism to contain roots being elevated in the conveyor and a cleaning mechanism for removing mud and foreign materials from the elevating conveyor.

17 Claims, 6 Drawing Figures

ROOT CROP HARVESTER

BACKGROUND OF THE INVENTION

The present invention relates generally to agricultural harvesting equipment and more particularly relates to harvesters for root crops such as sugar beets.

When root crops such as sugar beets are harvested, dirt often clings to the root surfaces, particularly when wet or moist ground conditions are encountered during the harvest. To remove the dirt, it has been customary to pass the roots over roll-type cleaning conveyors which in addition to conveying the roots also tumble the roots providing a scrubbing action thereto. Nevertheless, roots harvested during muddy soil conditions often pass over the rolls with enough mud clinging to them to result in a mud buildup around the rolls.

To provide a compact and easily transportable beet harvester, vertical auger conveyors have replaced bulky and wide chain conveyors to elevate the beets or roots to a position where they can be conveyed to a truck or trailer moving alongside the harvester. Should the conveyor rolls deliver muddy beets to these auger conveyors, the auger as well as the conveyor rolls often become impacted with mud buidup. Consequently, both of these mechanisms often become ineffective or overly aggressive and thereby damage or crush the beets.

An additional problem frequently encountered occurs when harvesting conditions expose the beet harvester to rocks and other foreign materials intermixed with the beets. Usually the conveying rolls and grab rolls are placed sufficiently far apart to permit loosened soil, small rocks and other foreign material to pass therealong. However, when rocky soil conditions are encountered, rocks conveyed with the beets to the elevating auger may, if of a certain size, become wedged or jammed between the rolls or auger and its housing resulting in significant damage to the harvester and accompanying lost or downtime.

SUMMARY OF THE INVENTION

In accordance with the foregoing problems, applicant has provided in the present invention a compact, easily transportable beet harvester having an upright annular elevator capable of effectively elevating mud laden roots and ejecting them from the elevator onto a laterally extending conveyor whereby they are delivered to an outer deposit area or adjacent storage tank.

More specifically, applicant has provided a beet harvester wherein the conveying structures are designed to convey mud laden roots intermixed with some foreign materials such as rocks.

To this end, the annular elevator is designed to elevate mud laden roots along with rocks and other foreign materials without causing damage to the mechanism or the beets. A stripper mechanism is provided to eject the elevated beets, rocks and foreign material from the annular elevator and clean the mud from the beet retaining baskets in the elevating conveyor to prevent the elevator from becoming ineffective or overly aggressive.

The annular elevating conveyor is supported for rotation by means separated from the root conveying path to insure noncontaminated operation and the cross roll conveyors are supported at their discharge ends by means separated from the discharge point to avoid mud buildup.

The annular elevator is driven by a chain means arranged to operate in mud contaiminated conditions and the crop roll conveyor rolls are provided helical flightings to minimize mud buildup while conveying roots axially therealong.

DESCRIPTION OF THE PREFERRED EMBODIMENT

Figure 1:
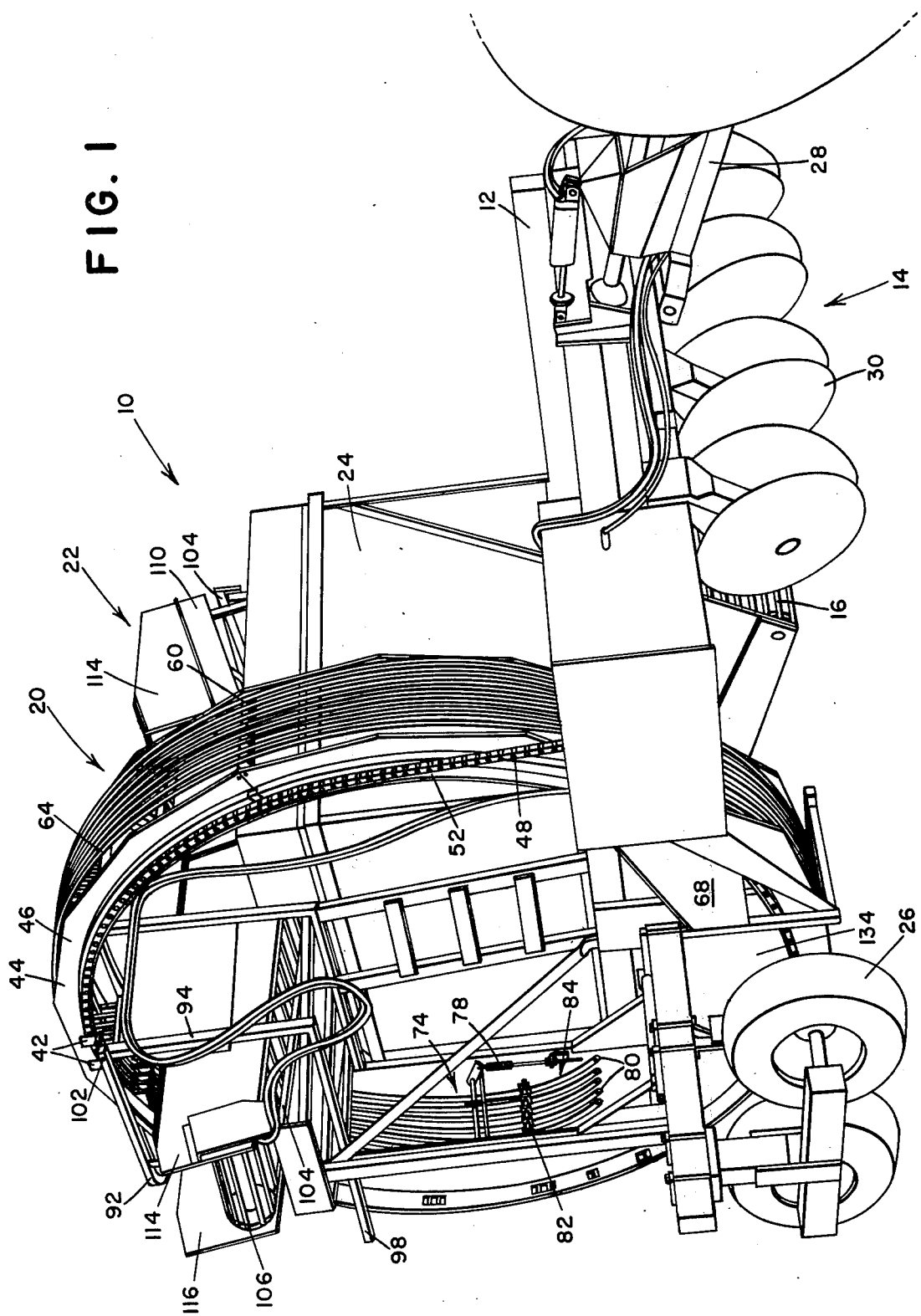
FIG. 1 is a side perspective of the harvester embodying the invention.

Referring now to the drawings and in particular FIG. 1, the beet harvester illustrated therein is indicated generally by the numeral 10 and includes a mobile frame 12, a root digging means 14, rearwardly extending first conveyor means 16, laterally extending second conveyor means 18, an annular elevator means 20, an elevated reversible conveyor means 22 and a root storage tank 24.

The frame 12 is supported on wheels 26 and includes a hitch 28 or suitable means for attachment to a tractor or similar power source. A plurality of digger wheel assemblies 30 are secured across the forward end of the frame 12 in a spaced relation to each other and each includes a pair of lifter wheels.

A first conveyor means 16 is carried directly behind the digger wheel assemblies 30 to receive beets from the digger wheel assemblies 30 and convey the same upwardly and rearwardly.

A second conveyor means designated generally 18 and carried by the frame 12 directly rearwardly of the first conveyor means 16 receives roots from the first conveyor means 16 for movement laterally. The second conveyor means 18 includes a plurality of powered elongated rolls 32 mounted in parallel relation. The rolls 32 are placed sufficiently close together to prevent roots deposited thereon from passing therebetween and each roll 32 is driven in a direction opposite of the roll 32 adjacent to it. Helical flightings 34 loosely encircle each roll 32 and are driven in a direction opposite to that of each flighting 34 respective roll 32. As the flightings 34 and rolls 32 rotate, the roots are conveyed axially and mud buildup between the rolls 32 and flightings 34 is minimized. At the discharge ends of the conveyor rolls 32 is partially enclosed root-receiving area and discharge chute 36 where conveyed roots accumulate and are diverted into the annular elevator means 20 passing beneath.

Supporting the annular elevator means 20 for rotation about a horizontally transverse axis are roller means including support wheels 38 and 40 positioned respectively forwardly and rearwardly of the axis of rotation. Each support wheel 38 and 40 is suspended from the frame 12 and supports the annular elevator means 20 at its outer edges. Also included in the roller means are stabilizing wheels 42 placed at the top lateral edges of the annular elevator means 20 to maintain it in its vertical plane of rotation.

Figure 2:
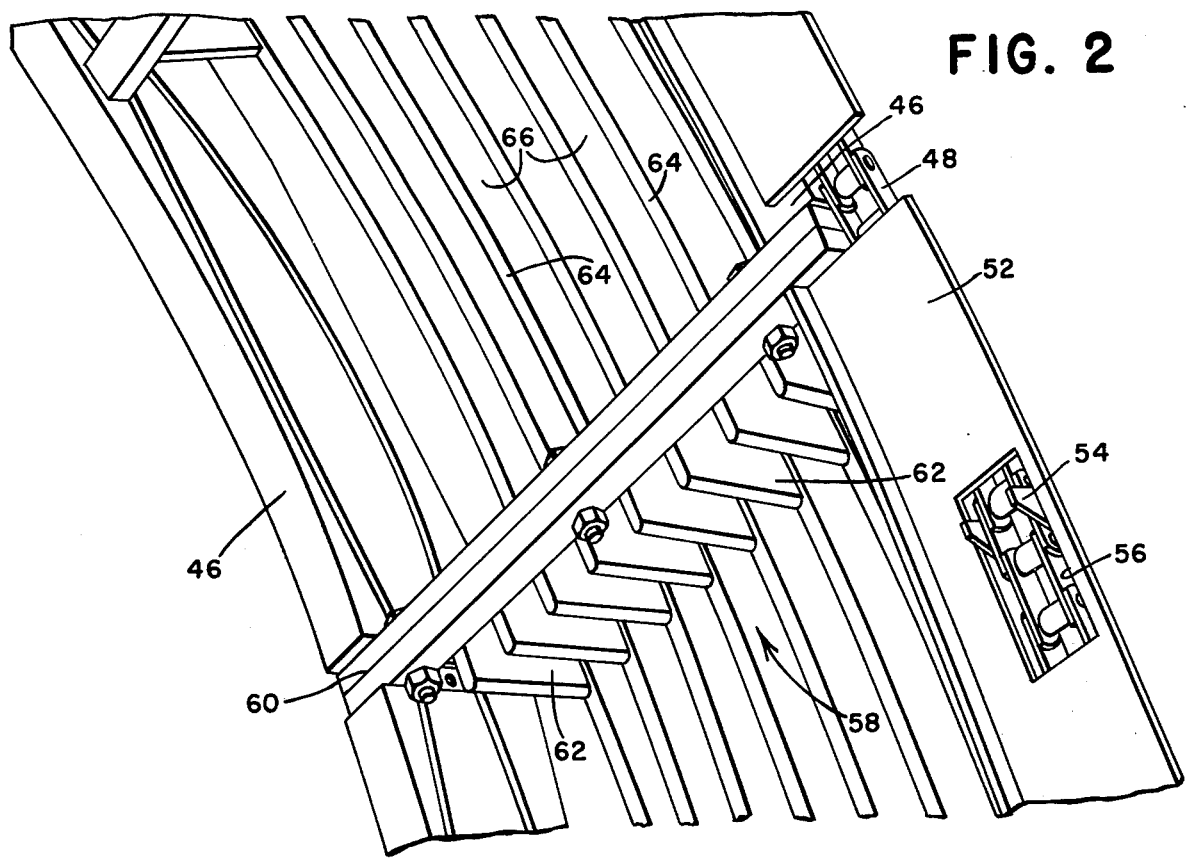
FIG. 2 is an expanded sectional perspective of the annular elevator basket means.

The annular elevator means 20 includes a large wheel 44 member comprised of a pair of substantially identical rim sections 46 coaxially positioned in parallel and face-to-face relation. The wheel 44 is rotated by a chain 48 driven by the harvester power train 50. The chain 46 is trained around a shelf 52 provided on the wheels rim section 46 and includes spaced apart teeth 54 which engage the shelf 52 through openings 56 in the shelf 52 to prevent slippage between the chain 48 and wheel 44. Spaced peripherally around the wheel member 44 between the rims 46 are basket means 58 wherein roots are deposited to be elevated and discharged onto the laterally extending and elevated reversible cross conveyor 22. As is best illustrated in FIG. 2, each basket means 58 is formed by cross members 60 secured at their ends between rim sections 46 and along their outer edges to radially extending bar members 62. The bar members 62 are in turn secured to peripherally extending rib members 64 positioned in parallel relation between their rim sections 46. Formed between the rib members 64 and bar members 62 and extending peripherally around the wheel 44 are parallel slotted openings 66 through which dirt, small rocks and other foreign materials can pass as the roots are conveyed.

Figure 3:
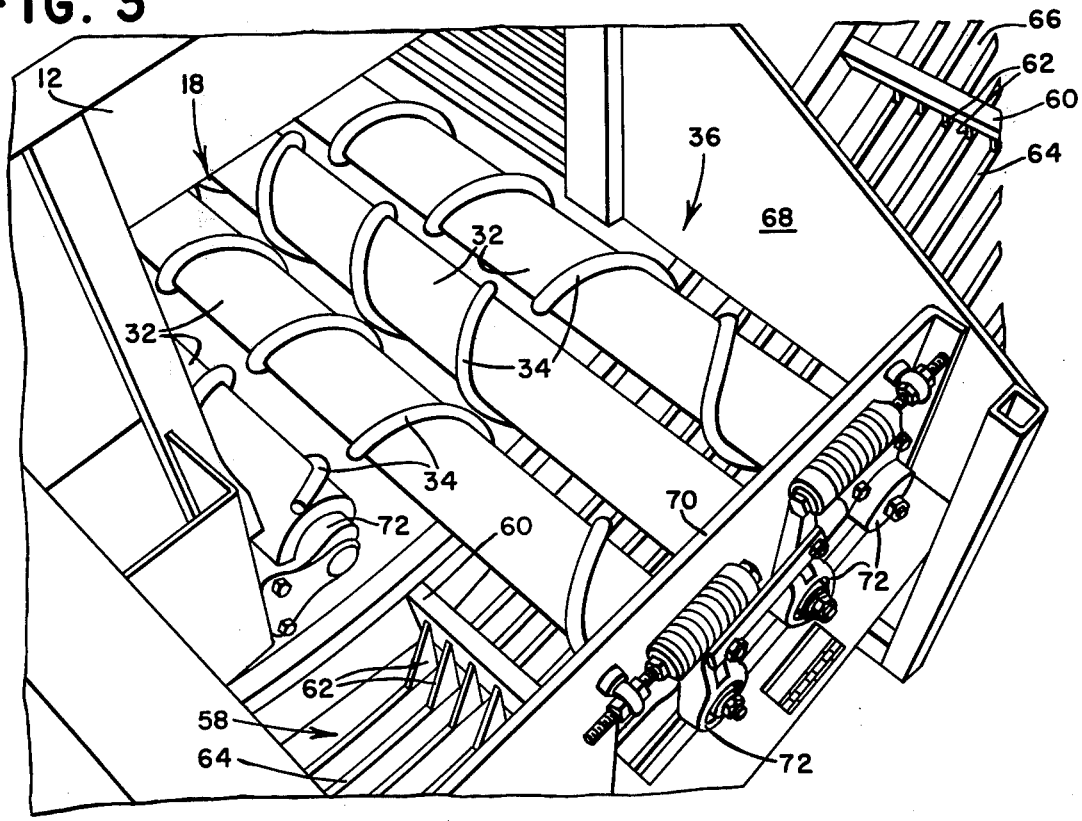
FIG. 3 is an expanded perspective of the cross conveyor rolls illustrating roll discharge ends in relation to the annular elevator.
Figure 4:
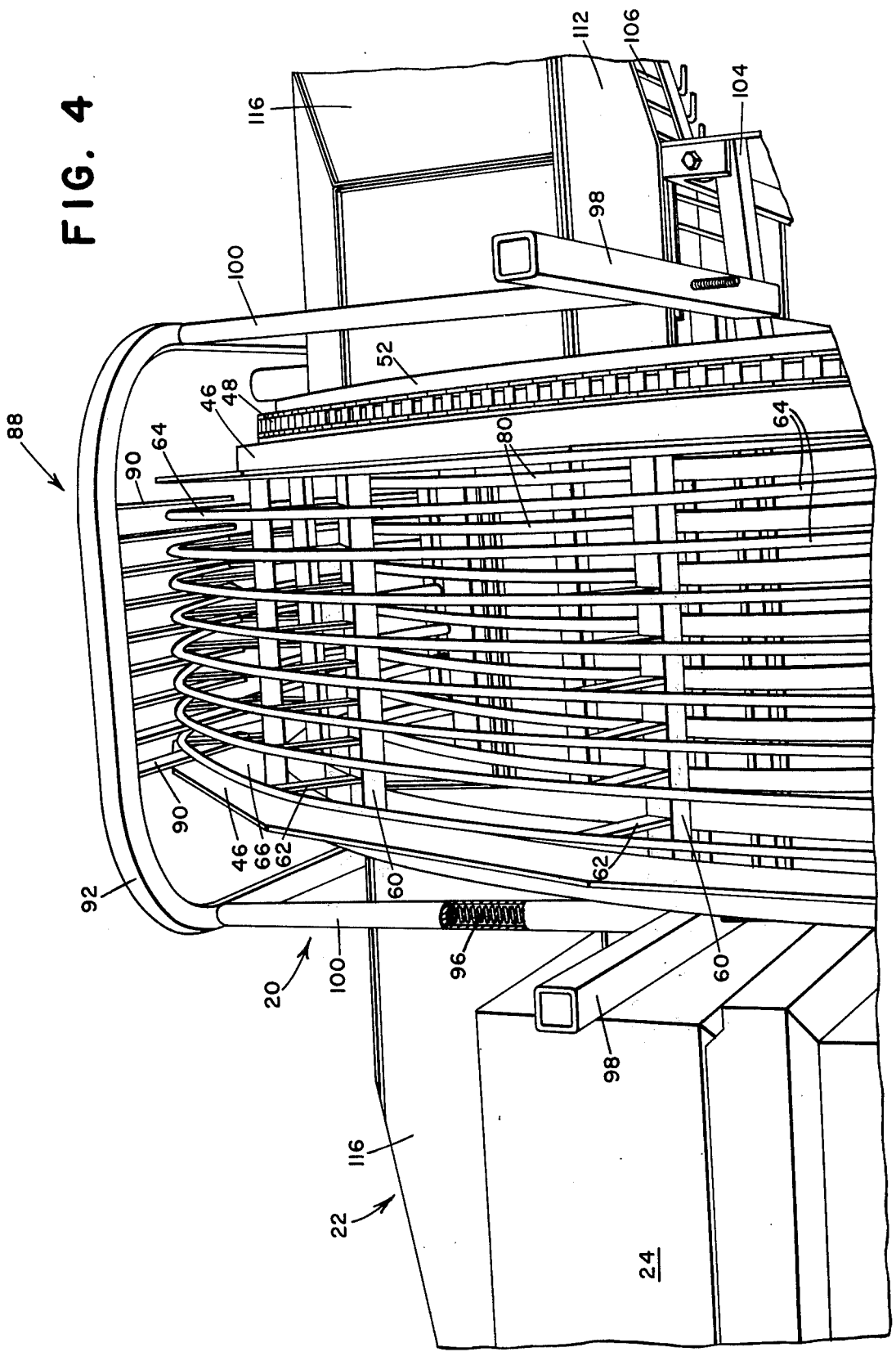
FIG. 4 is an expanded sectional perspective of the stripper means projecting into the annular elevator rib openings.

As roots are conveyed axially to the discharge end of second conveyor rolls 32 (see FIG. 3), they will abut plate members 68 and 70 and collect over the root-receiving portion of the annular elevator means 20 where basket means 58 move beneath the dishcharge ends of roll 32. When enough roots have accumulated in this root-receiving area 36, roots will begin to tumble rearwardly into the basket means 58 passing below. As will be noted from FIG. 3 the conveyor rolls 32 are supported by means laterally spaced from this root-receiving and discharge area 36 to minimize the opportunity for mud to accumulate around the bearings 72 and cause bearing failures.

Figure 5:
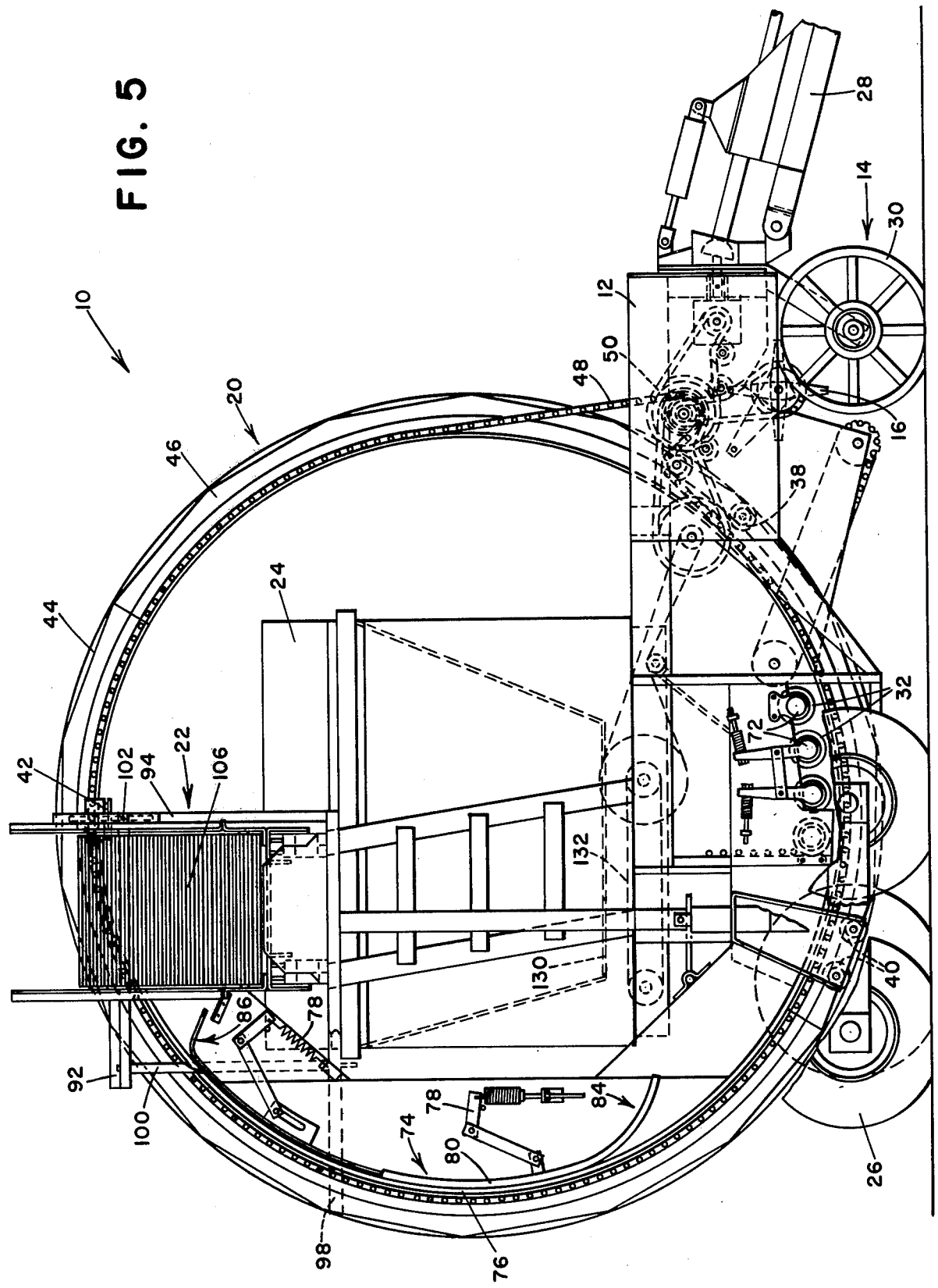
FIG. 5 is a side view of the harvester.

To retain the roots in the baskets means 58 as the wheel 44 is rotated and the roots are elevated, a retaining means 74 is provided (see FIGS. 1 and 5). This retaining means 74 is interiorly contiguous with the wheel 44 and forms therewith a passage 76 wherein roots are contained as they are elevated. The retaining means 74 is supported by the frame 12 on resiliently mounted supports 78 to permit it to yield when an excessive accumulation of roots or rocks are contained in a basket means 58 or when foreign materials have been conveyed to the basket means 58 and could wedge between the wheel 44 and retaining means 74.

The structure of the retaining means 74 is similar to the wheel structure in that it is also constructed of parallel spaced rib member 80 joined by cross members 82. Each end of the arcuately shaped retaining means 74 extends inwardly from the periphery of the wheel 44, the lower end 84 serving as a funnel for incoming roots and the upper or exit end 86 serving as a discharge chute for directing roots onto the receiving conveyor 22.

To eject rocks, foreign material and roots wedged between the wheel rib members 64 from the basket means 58 and onto the reversible conveyor 22 a stripper means 88 is provided. The stripper means 88 includes horizontally parallel finger members 90 secured at one end to a U-shaped frame 92 that is pivotally secured at its forward end to rigid and upstanding frame members 94. The frame 92 is attached at its rearward end to springs 96 secured at their lower ends with horizontal and rigid frame members 98. These springs 96 are placed inside the vertical sleeves 100 which abut with and act to limit the downward vertical movement of the U-shaped frame 92, but permit upwardly vertical movement of the frame 92 about its forwardly pivotal connection 102. This biasing arrangement permits the stripper fingers 90 and their U-shaped frame 92 yieldably rotate about the frames toward pivotal connections 102 as roots or other materials wedged between the wheel rib members fail to become loosened.

The reversible conveyor 22 is supported on the frame 12 and disposed in underlying and root-receiving relationship to the annular elevator means 20. It is supported on a pair of fore-and-aft spaced and laterally extending support rails 104 secured with the frame 12. The rails 104 extend under the wheel member 44 and are inclined upwardly at their outer ends. The reversible conveyor 22 includes an elongated endless conveyor 106 supported by two rollers 108 which support frame sections 110 and 112 inclined with respect to each other at their joint. Each frame section includes fore-and-aft spaced members 114 and 116 which serve to contain the roots being coveyed therebetween on the endless conveyor 106. An opening 118 in the rearwardly wall section 116 is provided to permit elevated roots to pass onto the reversible conveyor 22 from the annular elevator means 20.

Figure 6:
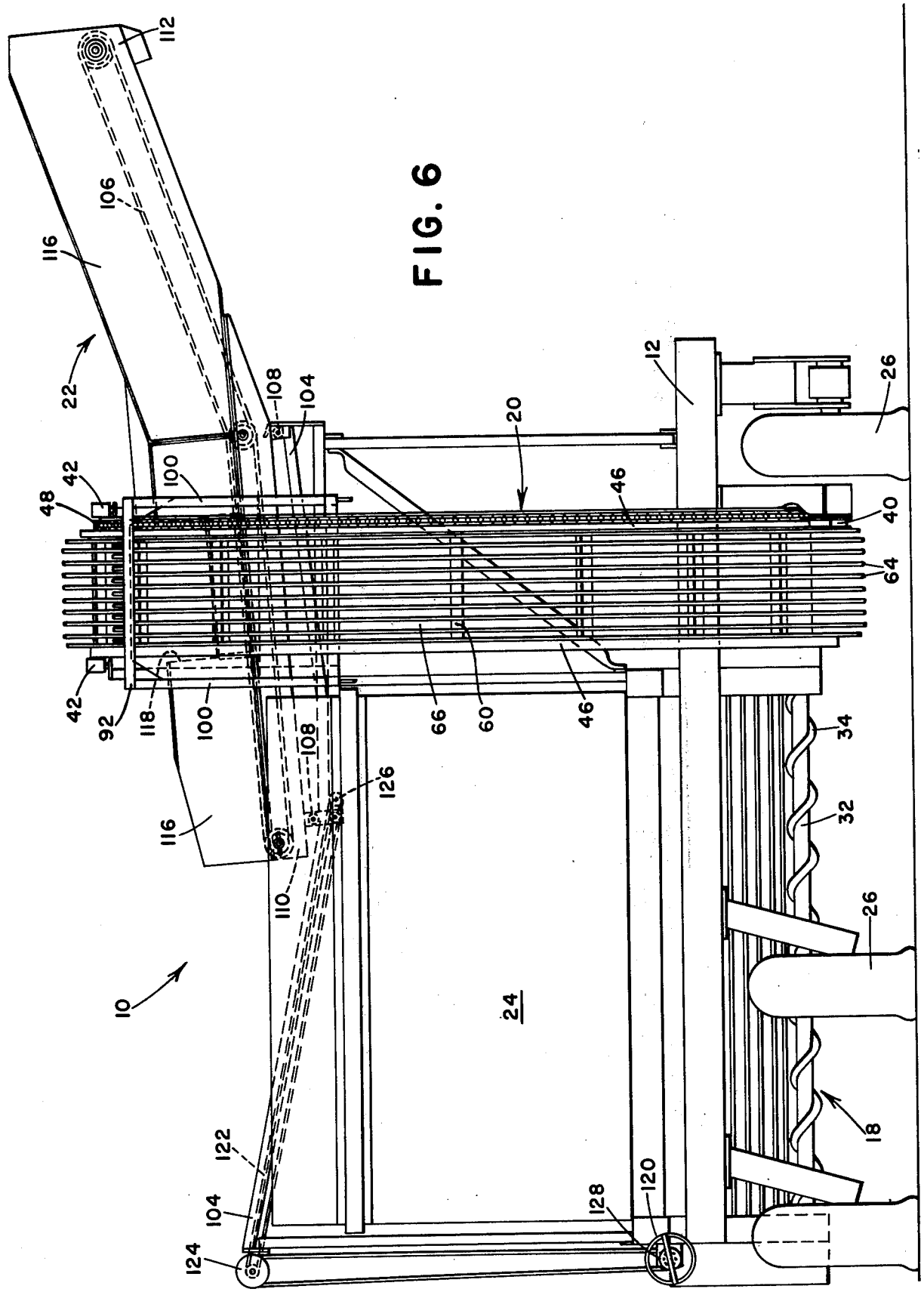
FIG. 6 is a rear view of the harvester with the lateral conveyor extended for loading beets onto a truck.

The reversible conveyor 22 is shiftable between a first retracted storage position as shown in FIG. 1 and a second extended operating position as illustrated in FIG. 6. To move the conveyor 22 between these two positions, a manually operated chain and sprocket winch having a crank 120 is rotated to move the conveyor secured chain 122 trained over sprockets 124 and 126. Because the chain 122 is secured to the conveyor frame section 110 and the sprockets 124 and 126 are secured to the implement frame 12, the conveyor 22 will be shifted laterally as the crank 120 is rotated. To secure the conveyor 22 in either of its positions, lock means including a suitable pin are inserted into the crank 120 and frame member 128 forward of it. A hydraulic motor (not shown) reversibly powers the endless conveyor 106 to move roots either inwardly to the storage tank 24 or outwardly to a truck following alongside the harvester. Because both the rails 104 and reversible conveyor frame 110 and 112 are inclined when extended, trucks having a higher side bed clearance can be utilized to haul harvested roots from the fields.

When no truck is available to receive roots from the harvester, the roots can be deposited in the storage tank 24. The root storage tank 24 is provided with means for discharging stored roots onto the powered second conveyor means 18 for subsequent delivery to an available truck. The tank 24 includes an opening 130 in the bottom and a conveyor 132 which can move stored roots forwardly for discharge onto the second conveyor means 18 for movement laterally to the annular elevator means 20. Elevated roots are then deposited onto the reversible conveyor 22 and moved to the waiting truck.

In operation the digging means 14 are operative to lift the roots from the ground and move them rearwardly to the first conveyor means designated generally by the number 16. The roots are then conveyed upwardly and rearwardly to the laterally extending second conveyor means 18. The second conveyor rolls 32 rotate oppositely of their respective helical flighting 34 and consequently operate to clean mud and other materials from the rolls. The roots are conveyed axially by the helical flightings 34 and enter the root-receiving area 36 wherein they accumulate and drop off into the basket means 58 passing below. Partition members 134 on each side of the wheel 44 in this area prevent the roots from falling onto the ground.

As the roots fall into the basket means 58, they group against the bar members 62. Should too many roots accumulate in a particular basket means 58, the lower end 84 of the retaining means 74 will deflect some roots into the next basket means 58. Should too many roots nevertheless enter the passage 76, the retaining means 74 will yield moving forwardly to permit the roots to pass upwardly. When rocks or other foreign materials are conveyed in the basket means 58, the retaining means 74 will yield before damage is caused to the retaining rib members 80 or wheel rotations prevented. As roots are elevated, they are retained within their respective basket means 58 until they reach the upper end of the retainer means. They then tumble down the inwardly inclined retainer means upper end 86 through the opening 118 in the frame wall 116 and onto the reversible conveyor's endless conveyor 22. Should some roots be wedged in the wheel 44 or rocks, mud or other material cling to the wheel, the stripper fingers 90 will force it clear of the wheel rib members 64 and it too will be ejected onto the reversible conveyor 22.

Normally, the reversible conveyor 22 will be in the extended operating position shown in FIG. 6 and the transfer truck moving along beneath the conveyor outer end. However, should the truck become filled and no replacement be available, the harvester need not stop since the harvested roots can be conveyed inwardly and deposited into the storage tank 24. When an empty truck does finally arrive, the stored beets can be conveyed out the tank opening 130 to the lateral extending second conveyor means 18 and again elevated to the reversible conveyor 22 for subsequent deposit in the empty truck.

I claim:

1. A root crop harvester comprising: a mobile frame, root digging means secured across the forward end of the frame; first conveyor means disposed rearwardly of the digging means and inclined upwardly and rearwardly therefrom for receiving roots from the digging means and conveying the roots upwardly and rearwardly; annular elevator means supported on the frame for rotation about a horizontal axis, the interior lower portion thereof defining a root-receiving area; second conveyor means disposed rearwardly of the first conveyor means and transverse thereto for receiving roots from the first conveyor means and for moving the same transversely to the root-receiving area; means transversely spaced from the root-receiving area for supporting the second conveyor means at its discharge end; means for diverting roots from the second conveyor means onto the root-receiving area; a root storage tank carried by the frame above said second conveyor means and adjacent said annular elevator means and having means therein for discharging the stored roots onto the second conveyor means; and a reversible conveyor means supported on the frame and disposed in underlying and root-receiving relationship to the annular elevator means for receiving roots therefrom and moving the same transversely to either an outer deposit area or the root storage tank.

2. A root crop harvester defined in claim 1 wherein the annular elevator means includes support wheels, stabilizing wheels and a wheel member, said wheel member supported by the support wheels for rotation in a vertical fore-and-aft extending plane and maintained upright in said plane by the stabilizing wheels, the latter being carried by the frame and being spaced from the wheel member's center of rotation.

3. A root crop harvester defined in claim 1 wherein a driven flexible member is peripherally trained about the annular elevator means for rotating said elevator means.

4. A root crop harvester defined in claim 1 wherein the second conveyor means includes a plurality of powered elongated rolls rotatably mounted in parallel relation and sufficiently close to each other to prevent roots deposited thereon from passing therebetween.

5. A root crop harvester defined in claim 4 wherein adjacent rolls are driven in opposite directions to move roots axially along the rolls.

6. A root crop harvester comprising: a mobile frame; root digging means secured across the forward end of the frame; first conveyor means disposed rearwardly of the digging means and inclined upwardly and rearwardly for receiving roots from the digging means and conveying the roots upwardly and rearwardly; annular elevator means supported by the frame for rotation in a vertical fore-and-aft extending plane, the interior lower portion of said annular elevator means defining a root-receiving area, said elevator means supported at its lower portion on one side by frame carried supporting wheels and maintained upright by frame carried stabilizing wheel means acting on its upper portion on the other side; a second conveyor means including a plurality of powered conveyor rolls disposed rearwardly of and transversely to the first conveyor means to receive roots therefrom and move the same transversely to the root-receiving area, said rolls rotatably mounted in parallel relation and supported at their discharge ends by means transversely spaced from the root-receiving area; means for diverting roots from the conveyor rolls onto the root-receiving area; a root storage tank carried by the frame above the powered conveyor rolls and adjacent the annular elevator means, said tank having means therein for discharging the stored roots onto the powered conveyor rolls; and a reversible conveyor supported on the frame and disposed in underlying and root-receiving relationship to the annular elevator means for receiving roots therefrom and moving the same transversely to either a first tank storage position or a second outer deposit position.

7. A root crop harvester defined in claim 6 wherein the harvester further includes a frame carried stripper means having substantially rigid fingers and the annular elevator means includes a wheel member having peripherally spaced apart root conveying basket means including laterally spaced openings wherein the stripper fingers are projected to eject elevated roots and foreign materials.

8. A root crop harvester defined in claim 7 further characterized as having a root retaining means supported by resilient members, said retaining means interior to the wheel member and in face-to-face relation with the elevating portion thereof to form therewith a substantially enclosed passage wherein roots being elevated are contained.

9. A root crop harvester defined in claim 6 wherein the reversible conveyor means includes an elongated endless conveyor means having one end inclined with respect to the other end, said conveyor shiftably supported for movement between a first retracted position whereby roots received are conveyed to said tank and a second extended position whereby received roots are moved to an elevated deposit area.

10. A root crop harvester as defined in claim 9 wherein the reversible conveyor is shifted between its first and second positions by a manually drived chain and sprocket winch having lock means for securing said conveyor in either position.

11. A root harvester comprising: a mobile frame; root digging means secured across the forward end of the frame; first conveyor means disposed rearwardly of the digging means and inclined upwardly and rearwardly therefrom for receiving roots from the digging means and conveying the roots upwardly and rearwardly; annular elevator means supported by the frame for rotation in a vertical fore-and-aft extending plane, the interior lower portion of the annular elevator means defining a root-receiving area; second conveyor means disposed rearwardly of the first conveyor means and transverse thereto for receiving roots from the first conveyor means and for moving the same transversely to the root-receiving area; means transversely spaced from the root-receiving area for supporting the second conveyor means at its discharge end; means for diverting roots from the second conveyor onto the root-receiving area; a root storage tank carried by the frame above the second conveyor means and adjacent the annular elevator means, said tank having means therein for discharging the stored roots onto the second conveyor means; and a reversible conveyor means having one end inclined with respect to the other and, said conveyor means shiftably disposed in root-receiving relationship to the annular elevator means for movement between a first retracted position whereby roots received are conveyed to said storage tank and a second extended position whereby received roots are moved to an elevated deposit area.

12. A root crop harvester comprising: a mobile frame; root digging means secured across the forward end of the frame; first conveyor means disposed rearwardly of the digging means and inclined upwardly and rearwardly therefrom for receiving roots from the digging means and conveying the roots upwardly and rearwardly; annular elevator means carried on the frame for rotation in a vertical and fore-and-aft extending plane, sid elevator means supported at its lower portion on one side by frame carried supporting wheels and maintained upright by frame carried stabilizing wheel means acting on its upper portion on the other side, the annular elevator means having peripherally spaced apart root conveying basket means having laterally spaced openings; frame carried stripper means for projecting through the spaced openings of said basket means to eject elevated roots and foreign material; a root retaining means interior to the annular elevator means and in face-to-face relation with the elevating portion thereof to form therewith a substantially enclosed passage wherein roots being elevated are contained; resilient means supporting the retainer means on the frame, the interior lower portion of said annular elevator means defining a root-receiving area; a second conveyor means including a plurality of powered conveyor rolls disposed rearwardly of the first conveyor means for receiving roots therefrom and for moving the same transversely to the root-receiving area, said rolls rotatably mounted in parallel relation and supported at their discharge ends by means transversely spaced from the root-receiving area; means for diverting roots from the conveyor rolls onto the root-receiving area; a root storage tank carried by the frame above the powered conveyor rolls adjacent the annular elevator means, said tank including means therein for discharging the stored roots onto the powered conveyor rolls; and a reversible conveyor means supported on the frame and disposed in root-receiving relationship to the annular elevator means for receiving roots therefrom and moving the same transversely to either an outer deposit area or to the root storage tank.

13. A root crop harvester comprising: a mobile frame; root digging means secured across the forward end of the frame: first conveyor means disposed rearwardly of the digging means and inclined rearwardly and upwardly therefrom for receiving roots from the digging means and conveying the roots upwardly and rearwardly; annular elevator means carried on the frame for rotation in a vertical and fore-and-aft extending plane, the annular elevator means having interior peripherally spaced apart root conveying basket means having laterally spaced openings; frame carried stripper means for projecting through the spaced opeinings of said basket means to eject elevated roots and foreign material; a root retaining means interior to the annular elevator means and in face-to-face relation with the elevating portion thereof to form therewith a substantially enclosed passage wherein roots being elevated are contained; resilient means supporting the retainer means on the frame, the interior lower portion of said annular elevator means defining a root-receiving area; a second conveyor means including a plurality of powered conveyor rolls disposed rearwardly of the first conveyor means for receiving roots therefrom and for moving the same transversely to the root-receiving area, said rolls rotatably mounted in parallel relation and supported at their discharge ends by means tranversely spaced from the root-receiving area; means for diverting roots from the conveyor rolls onto the root-receiving area; a root storage tank carried by the frame above the powered conveyor rolls adjacent the annular elevator means, said tank including means therein for discharging said stored roots onto the powered conveyor rolls; and a reversible conveyor means having one end inclined with respect to the other end, said conveyor means shiftably disposed in root-receiving relationship to the annular elevator means for movement between a first retracted position whereby roots received are conveyed to the storage tank and a second extended position whereby received roots are moved to an elevated position.

14. A root crop harvester comprising: a mobile frame; root digging means secured across the forward end of the frame; first conveyor means disposed rearwardly of the digging means and inclined rearwardly and upwardly therefrom for receiving roots from the digging means and conveying the roots upwardly and rearwardly; annular elevator means supported by the frame at one end thereof for rotation in a vertical fore-and-aft extending plane, the interior lower portion of the annular elevator means defining a root-receiving portion; a plurality of transversely extending powered conveyor rolls disposed rearwardly of the first conveyor means for receiving roots from the first conveyor means and for moving the same transversely for discharge onto the root-receiving portion of the elevator, said rolls rotatably mounted in parallel relation with at least a portion thereof extending through the elevator and at least a portion thereof terminating at the elevator whereby roots transferred by the rolls will gravitate onto the root-receiving portion as they move beyond the ends of the latter rolls; a root storage tank carried by the frame above the powered conveyor rolls and adjacent the annular elevator means, said tank having means therein for discharging the stored roots onto the powered conveyor rolls; and a reversible transversely elongated conveyor means disposed above the tank and supported on the frame to extend through the elevator, said conveyor means opening upwardly for receiving roots from the elevator and moving the same transversely to either an outer deposit area or to said root storage tank.

15. A root crop harvester comprising: a mobile frame; root digging means secured across the forward end of the frame; first conveyor means disposed rearwardly of the digging means and inclined rearwardly and upwardly therefrom for receiving roots from the digging means and conveying the roots upwardly and rearwardly; annular elevator means supported by the frame at one end thereof for rotation in a vertical fore-and-aft extending plane, the interior lower portion of the annular elevator means defining a root-receiving portion; a plurality of transversely extending powered conveyor rolls disposed rearwardly of the first conveyor means for receiving roots from the first conveyor means and for moving the same transversely for discharge onto the root-receiving portion of the elevator, said rolls rotatably mounted in parallel relation with at least a portion thereof extending through the elevator; means on the frame transversely spaced from said root-receiving portion of said elevator supporting the aforesaid portion of the rolls; means for diverting said roots from the rolls and onto the root-receiving portions of said elevator; a root storage tank carried by the frame above the powered conveyor rolls and adjacent the annular elevator means, said tank having means therein for discharging the stored roots onto the powered conveyor rolls; and a reversible transversely elongated conveyor means disposed above the tank and supported on the frame to extend through the elevator, said conveyor means opening upwardly for receiving roots from the elevator and moving the same transversely to either an outer deposit area or to said root storage tank.

16. The invention defined in claim 1 wherein the second conveyor means includes a plurality of transverse conveyor rolls, a portion thereof extending through the annular elevator means, and a portion thereof terminating at the elevator means with said rolls supported adjacent the elevator means by bearing means transversely spaced from the root-receiving area.

17. The invention defined in claim 1 wherein the means for diverting roots includes upstanding wall members adjacent the forward and transverse portions of the discharge end of said second conveyor means.

* * * * *

UNITED STATES PATENT OFFICE
CERTIFICATE OF CORRECTION

Patent No. 4,024,920   Dated  24 May 1977

Inventor(s)  Virgil Dean Haverdink

It is certified that error appears in the above-identified patent and that said Letters Patent are hereby corrected as shown below:

Column 6, line 51, after "veyor" insert --means--.

Column 7, line 53, delete "sid" and insert --said--.

Signed and Sealed this

Seventeenth Day of January 1978

[SEAL]

Attest:

RUTH C. MASON
Attesting Officer

LUTRELLE F. PARKER
Acting Commissioner of Patents and Trademark